United States Patent
Lin et al.

(10) Patent No.: US 12,112,516 B2
(45) Date of Patent: Oct. 8, 2024

(54) NON-INTRUSIVE DETECTION METHOD AND DEVICE FOR POP-UP WINDOW BUTTON

(71) Applicant: ADLINK Technology Inc., Taoyuan (TW)

(72) Inventors: Chien-Chung Lin, Taoyuan (TW); Wei-Jyun Tu, Taoyuan (TW); Yu-Yen Chen, Taoyuan (TW)

(73) Assignee: ADLINK Technology Inc., Taoyuan (TW)

( * ) Notice: Subject to any disclaimer, the term of this patent is extended or adjusted under 35 U.S.C. 154(b) by 569 days.

(21) Appl. No.: 17/498,566

(22) Filed: Oct. 11, 2021

(65) Prior Publication Data
US 2022/0414390 A1 Dec. 29, 2022

(30) Foreign Application Priority Data

Jun. 25, 2021 (TW) ................................ 110123276

(51) Int. Cl.
*G06V 10/44* (2022.01)
*G06T 5/30* (2006.01)
(Continued)

(52) U.S. Cl.
CPC ................ *G06V 10/44* (2022.01); *G06T 5/30* (2013.01); *G06T 7/13* (2017.01); *G06T 7/62* (2017.01);
(Continued)

(58) Field of Classification Search
None
See application file for complete search history.

(56) References Cited

U.S. PATENT DOCUMENTS 10,733,754 B2   8/2020  Dayanandan
2020/0019827 A1* 1/2020  Howard ........... G06K 19/06037
(Continued)

FOREIGN PATENT DOCUMENTS

CN   102194118 A  *  9/2011
CN   105391971 A  *  3/2016
(Continued)

OTHER PUBLICATIONS

Zhao Z, Liu X. A segment-based advertisement search method from TV stream. In2010 2nd International Conference on Future Computer and Communication May 21, 2010 (vol. 2, pp. V2-690). IEEE. (Year: 2010).*

*Primary Examiner* — Emily C Terrell
*Assistant Examiner* — Nathan J Bloom (57) ABSTRACT

A non-intrusive detection method for detecting at least one pop-up window button of the pop-up window includes the following steps: retrieving a screen image on a display device; comparing the screen image with a preset screen image and generating a differential image area according the screen image and the preset screen image; determining the differential image area as the pop-up window when the differential image area is greater than an image area threshold value; selecting a plurality of contour lengths of the pop-up window matching up with a contour length threshold value by Canny edge detector; and analyzing the contour lengths according to Douglas-Peucker algorithm and an amount of endpoints to generate a contour edge corresponding to the pop-up window button.

12 Claims, 5 Drawing Sheets

(51) Int. Cl.
*G06T 7/13*     (2017.01)
*G06T 7/62*     (2017.01)
*G06T 7/73*     (2017.01)
*G06V 10/28*    (2022.01)
*G06V 10/46*    (2022.01)
*G06V 10/75*    (2022.01)
*G06V 30/10*    (2022.01)

(52) U.S. Cl.
CPC ............... *G06T 7/73* (2017.01); *G06V 10/28* (2022.01); *G06V 10/471* (2022.01); *G06V 10/752* (2022.01); *G06T 2207/10016* (2013.01); *G06T 2207/20044* (2013.01); *G06T 2207/20164* (2013.01); *G06T 2207/20224* (2013.01); *G06V 30/10* (2022.01); *G06V 2201/02* (2022.01)

(56) References Cited

U.S. PATENT DOCUMENTS

2020/0228616 A1*  7/2020  Nishikawa .............. H04L 67/54
2021/0110150 A1*  4/2021  Kakrana .............. G06V 30/416

FOREIGN PATENT DOCUMENTS

| | | | | |
|---|---|---|---|---|
| CN | 108562274 A | * | 9/2018 | ............ G01C 11/04 |
| CN | 110865865 A | | 3/2020 | |
| CN | 111667429 A | * | 9/2020 | .............. G06T 5/80 |
| CN | 111949356 A | | 11/2020 | |
| CN | 112099885 A | | 12/2020 | |
| CN | 112511779 A | * | 3/2021 | ........... H04N 21/435 |
| TW | 202106041 A | * | 2/2021 | |
| WO | WO-2019239989 A1 | * | 12/2019 | ............. G02F 1/133 |

* cited by examiner

NON-INTRUSIVE DETECTION METHOD AND DEVICE FOR POP-UP WINDOW BUTTON

BACKGROUND OF THE INVENTION

Field of the Invention

The present invention relates to a non-intrusive detection method and device, and in particular, to a non-intrusive detection method and device that can automatically detect pop-up windows and pop-up window buttons.

Description of the Prior Art

With the rapid development of industry, the equipment of many factories is gradually moving towards automation. The equipment usually includes a screen to display the current production progress or various parameters, so that the operator can check the operation status of the equipment. In recent years, with the development of industrial intelligence, many factories have been installing non-intrusive devices to connect to the equipment for remotely controlling and collecting the data on the screens of the equipment, instead of manual operations.

However, when the non-intrusive device is monitoring the screen of the equipment, unexpected pop-up windows may appear on the peripheral devices or the screen of the equipment, such as warning windows and selective windows. Therefore, the pop-up window may shade the production parameters on the screen or the data that needs to be detected when a pop-up window appears on the device, so that the non-intrusive device cannot recognize the data, which causes an abnormality and results in interruption of the operation of the equipment, and further reduces efficiency.

Therefore, it is necessary to develop a new type of detection mechanism for pop-up window and pop-up window button to solve the problems of the prior art.

SUMMARY OF THE INVENTION

In response to the above-mentioned problems, an objective of the present invention is to provide a non-intrusive detection method for pop-up window button.

In an embodiment, the non-intrusive detection method for pop-up window button is configured for recognizing at least one pop-up window button of a pop-up window on a display device. The non-intrusive detection method comprising the following steps of: step S1: retrieving a screen image of the display device; step S2: comparing the screen image with a preset screen image, and generating a differential image area according the screen image and the preset screen image; step S3: determining whether the differential image area is greater than an image area threshold value; step S4: determining the differential image area as the pop-up window when the differential image area is greater than the image area threshold value; step S5: presetting a contour length threshold value of the pop-up window, and selecting a plurality of contour lengths greater than the contour length threshold value by Canny edge detector; and step S6: presetting an amount of endpoints of the pop-up window button, and interpreting the contour lengths according to Douglas-Peucker algorithm and the amount of endpoints to generate a contour edge corresponding to the pop-up window button.

Moreover, the non-intrusive detection method for pop-up window button further includes the following steps of: step S11: determining whether the preset screen image exists, and executing step S2 if the determining result is yes; and step S12: replacing the preset screen image with the screen image if the determining result of step S11 is no.

Wherein, step S2 further includes the following steps of: step S21: subtracting the screen image from the preset screen image to generate a differential image; and step S22: calculating the differential image with binarization and image erosion methods to generate the differential image area.

Wherein, step S6 further includes the following steps of: step S61: determining the plurality of contour lengths according to the Douglas-Peucker algorithm and the amount of endpoints to generate a button contour similar to the pop-up window button; and step S62: generating the contour edge corresponding to the pop-up window button according to the button contour and a contour correction accuracy, wherein the contour correction accuracy is between 1% and 10% of the contour length.

Moreover, the non-intrusive detection method for pop-up window button further includes the following step of: step S7: analyzing the pop-up window button of the pop-up window by optical character recognition and generating a button text of the pop-up window button.

In one embodiment, the minimum value of the amount of endpoints is 4.

Another objective of the present invention is to provide a non-intrusive detection device for pop-up window button to solve the above-mentioned problems.

In one embodiment, the non-intrusive detection device for pop-up window button is configured for recognizing at least one pop-up window button of a pop-up window on a display device. The non-intrusive detection device for pop-up window button includes an image retrieving module, an image analyzing module and a computing module. The image retrieving module is configured for retrieving a screen image of the display device. The image analyzing module is connected to the image retrieving module and stores a preset screen image and an image area threshold value. The image analyzing module is configured to compare the screen image with the preset screen image and generate a differential image area according the screen image and the preset screen image. The image analyzing module determines the differential image area as the pop-up window when the differential image area is greater than the image area threshold value. The computing module is connected to the image analyzing module and stores a contour length threshold value and an amount of endpoints. The computing module is configured to select a plurality of contour lengths greater than the contour length threshold value by Canny edge detector and interpret the plurality of contour lengths according to Douglas-Peucker algorithm and the amount of endpoints to generate a contour edge corresponding to the pop-up window button.

Wherein, the image analyzing module replaces the preset screen image with the screen image when the preset screen image does not exist.

Wherein, the image analyzing module subtracts the screen image from the preset screen image to generate a differential image, and calculates the differential image with binarization and image erosion methods to generate the differential image area.

Wherein, the computing module pre-stores a contour correction accuracy. The computing module generates a button contour similar to the pop-up window button according to the Douglas-Peucker algorithm and the amount of endpoints, and generates a contour edge corresponding to the pop-up window button according to the button contour and the contour correction accuracy. Wherein, the contour correction accuracy is between 1% and 10% of the contour length.

Wherein, the non-intrusive detection device for pop-up window button of the present invention further includes an optical character recognizing module connected to the computing module. The optical character recognizing module is configured to analyze the pop-up window button of the pop-up window and generates a button text of the pop-up window button.

In summary, the non-invasive detection method and device for the pop-up window button of the present invention can automatically detect the pop-up window of the device and identify the pop-up window button in the pop-up window, thereby improving the practicability. Moreover, the non-intrusive detection method and device for the pop-up window button of the present invention can provide and identify complete pop-up window data, so that the operator can provide solutions based on all the data in the pop-up window, thereby improving processing efficiency and reducing labor costs and production costs. In addition, the non-invasive detection method and device for the pop-up window button of the present invention can also effectively identify the pop-up window of the display device through a variety of image processing methods and image recognition algorithms, thereby improving processing efficiency.

DETAILED DESCRIPTION OF THE INVENTION

In order to make the advantages of the present invention, the spirit and features can be more easily and clearly understood, the detailed description and discussion will be followed by specific embodiments and with reference to the accompanying figures. It is noted that the specific embodiments are merely representative of the specific embodiments of the present invention, and the specific methods, devices, conditions, materials, and the like are not intended to limit the invention or the corresponding embodiments. Moreover, the devices in the figures are only used to express their relative positions and are not drawn in their actual proportions.

In the description of the present invention, the description with reference to the terms "a specific embodiment", "another specific embodiment" or "partial specific embodiment" etc. means that the specific feature, structure, material or feature described in combination with the embodiment includes in at least one embodiment of this creation. In this specification, the schematic representations of the above-mentioned terms do not necessarily refer to the same embodiment. Moreover, the described specific features, structures, materials or characteristics can be combined in any one or more embodiments in a suitable manner.

Figure 1:
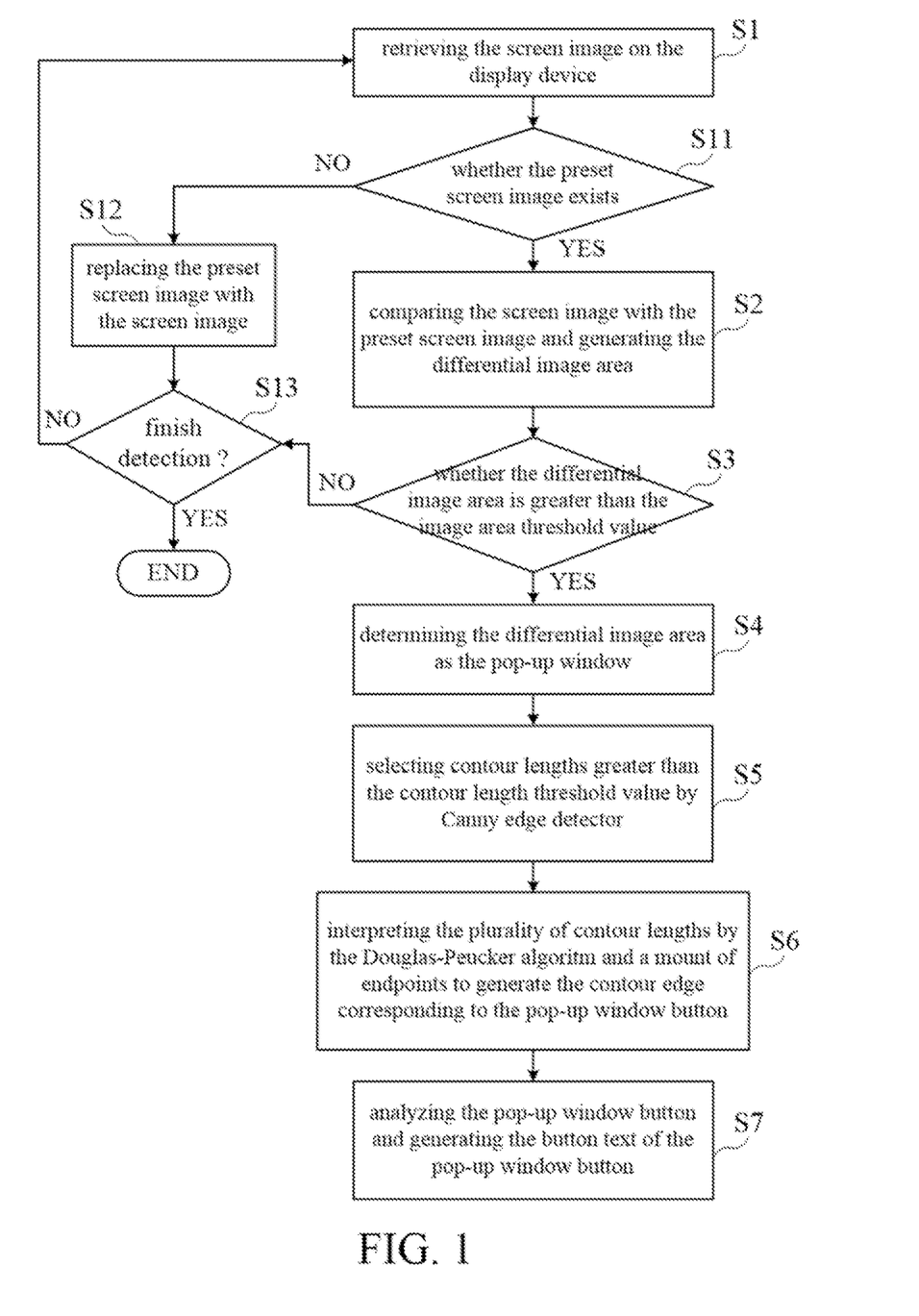
FIG. 1 is a flowchart showing the steps of a non-intrusive detection method for pop-up window button to an embodiment of the present invention.
Figure 2:
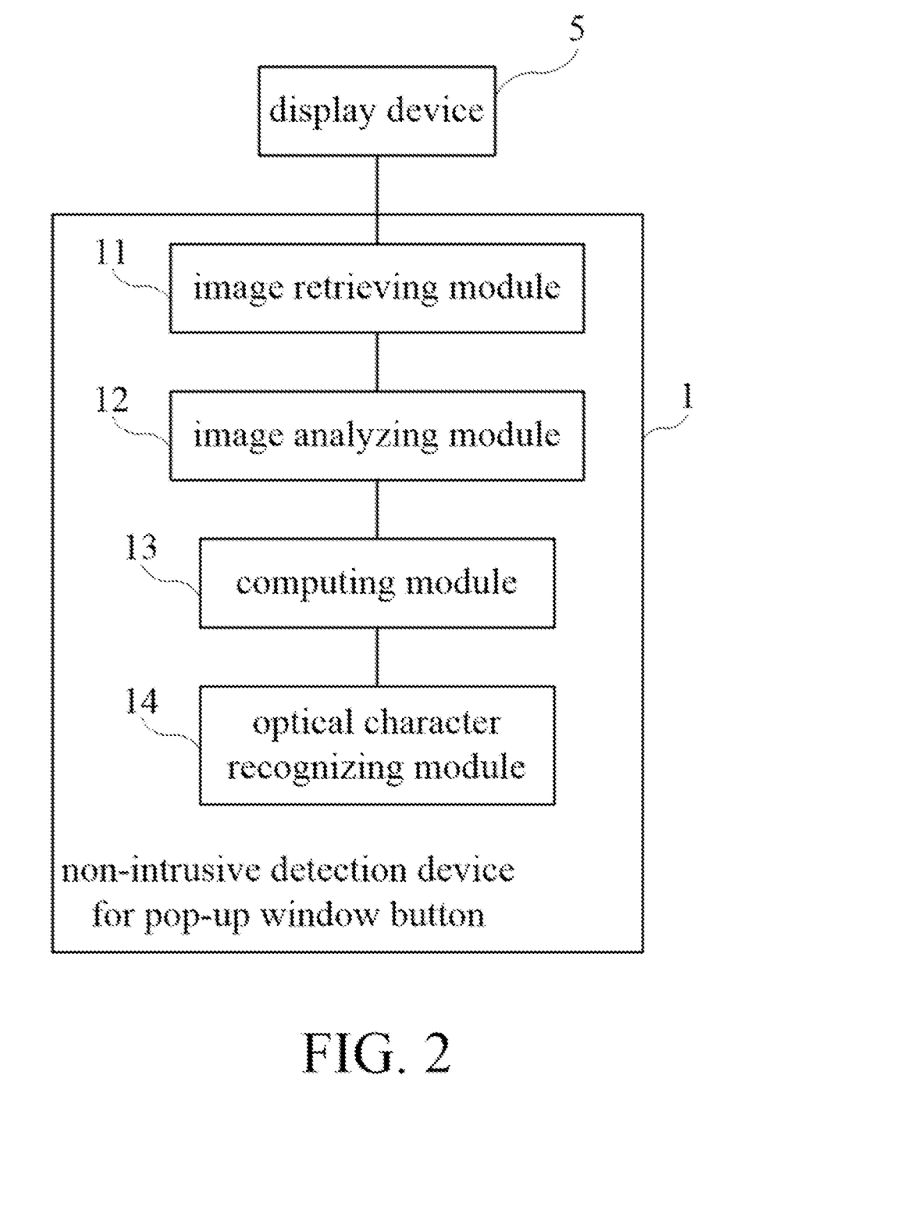
FIG. 2 is a function block diagram showing a non-intrusive detection device for pop-up window button to an embodiment of the present invention.

Please refer to FIG. 1 and FIG. 2. FIG. 1 is a flowchart showing the steps of a non-intrusive detection method for pop-up window button to an embodiment of the present invention. FIG. 2 is a function block diagram showing a non-intrusive detection device 1 for pop-up window button to an embodiment of the present invention. The non-intrusive detection method of FIG. 1 can be executed by the non-intrusive detection device 1 for the pop-up window button of FIG. 2. As shown in FIG. 2, the non-intrusive detection device 1 for pop-up window button includes an image retrieving module 11, an image analyzing module 12, a computing module 13 and an optical character recognizing module 14. Moreover, the non-intrusive detection device 1 for pop-up window button can be connected to a display device 5 of an equipment to retrieve and monitor the screen image and data on the display device 5. The image analyzing module 12 is connected to the image retrieving module 11 and stores a preset screen image and an image area threshold value. The computing module 13 is connected to the image analyzing module 12 and pre-stored a contour length threshold value and an amount of endpoints. The optical character recognizing module 14 is connected to the computing module 13 and configured to analyze the pop-up window button of the pop-up window and generates a button text of the pop-up window button. In practice, the image retrieving module 11 may be an image retrieving chip, the image analyzing module 12 may be an image analyzing chip, the computing module 13 may be a CPU and the optical character recognizing module 14 may be an optical character recognizing chip, but it is not limited hereto. The image retrieving module 11 and the image analyzing module 12 can be integrated in an image processing chip, and the optical character recognizing module 14 may be other chips with text recognizing function.

As shown in FIG. 1 and FIG. 2, in this embodiment, the non-intrusive detection method for pop-up window button is configured for recognizing a pop-up window 51 on a display device 5 and at least one pop-up window button 52 of the pop-up window 51. The non-intrusive detection method for pop-up window button includes the following steps of: step S1: the image retrieving module 11 retrieves a screen image of the display device 5; step S2: the image analyzing module 12 compares the screen image with a preset screen image, and generates a differential image area according the screen image and the preset screen image; step S3: the image analyzing module 12 determines whether the differential image area is greater than an image area threshold value; step S4: the image analyzing module 12 determines the differential image area as the pop-up window 51 when the differential image area is greater than the image area threshold value; step S5: the computing module 13 selects a plurality of contour lengths greater than the contour length threshold value of the pop-up window 51 by Canny edge detector; step S6: the computing module 13 analyzes the contour lengths according to Douglas-Peucker algorithm and the amount of endpoints to generate a contour edge corresponding to the pop-up window button 52; and step S7: the optical character recognizing module 14 analyzes the pop-up window button 52 of the pop-up window 51 by optical character recognition and generates a button text of the pop-up window button 52.

In addition to the above-mentioned step S1~S7 in FIG. 1, the non-intrusive detection method for pop-up window button further includes the following steps of: step S11: the image analyzing module 12 determines whether the preset screen image exists after the image retrieving module 11 retrieves the screen image of the display device 5. If the preset screen image does not exist, the image analyzing module 12 replaces the preset screen image with the screen image retrieved by the image retrieving module 11 of the step S12; if the preset screen image already exists, the image analyzing module 12 executes the subsequent step S2. In practice, the image retrieving module 11 may retrieve the screen image of the display device 5 at different times, and the time interval for the image retrieving module 11 to retrieve screen images can be preset or manually set. The preset screen image may be the screen image of the equipment in normal operation. When the non-intrusive detection device 1 for pop-up window button is activated for the first time or restarted, the image analyzing module 12 does not include or may clear the preset screen image. At this time, the image analyzing module 12 stores the first screen image retrieved by the image retrieving module 11 as the preset screen image.

Furthermore, in the step S13, the operator can control whether the non-intrusive detection device 1 for pop-up window button should end the detection after the image analyzing module 12 stores the first screen image retrieved by the image retrieving module 11 as the preset screen image in step S12. If the detection is finished, the non-intrusive detection device 1 for pop-up window button will stop the detection of the pop-up window of the display device. If the detection does not finish, please return back to step S1, and the image retrieving module 11 will retrieve the screen image of the display device 5 at the next time point.

Figure 3A:
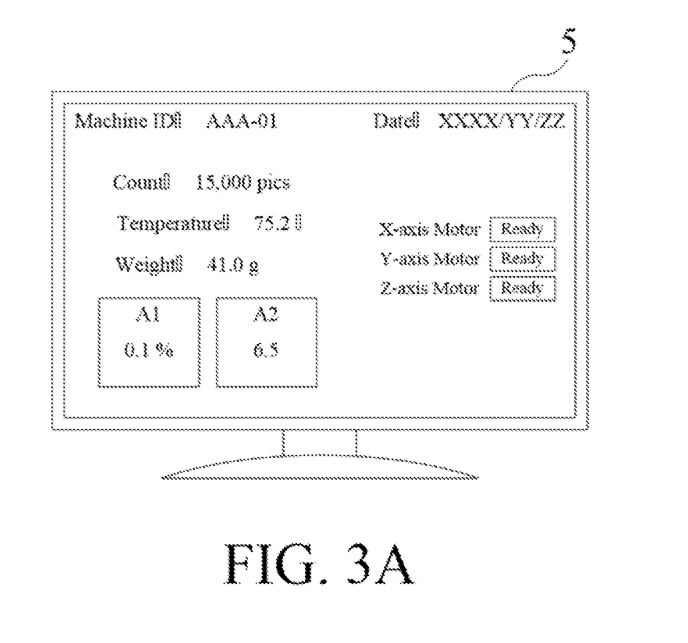
FIG. 3A is a schematic diagram showing the display device in FIG. 2.
Figure 3B:
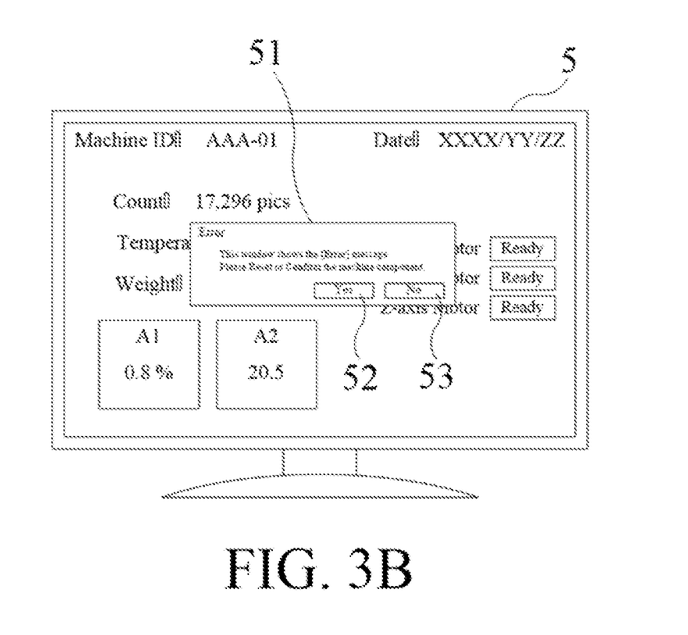
FIG. 3B is a schematic diagram showing the display device including the pop-up window in FIG. 2.

Please refer to FIG. 1, FIG. 2, FIG. 3A and FIG. 3B. FIG. 3A is a schematic diagram showing the display device 5 in FIG. 2. FIG. 3B is a schematic diagram showing the display device 5 including the pop-up window 51 in FIG. 2. As shown in step S2 in FIG. 1, FIG. 3A and FIG. 3B, when the image analyzing module 12 stores the preset screen image and the screen image of the display device 5 retrieved by the image retrieving module 11, the image analyzing module 12 compares the preset screen image with the screen image and generates a differential image area. For an example of FIG. 3A and FIG. 3B, the FIG. 3A shows the screen image of the display device 5 of the equipment in normal operation, and the FIG. 3B is the screen image of a pop-up window 51 appearing on the display device 5 of the device. In practice, the FIG. 3A may be the preset screen image stored in the image analyzing module 12, and the FIG. 3B may be the screen image retrieved by the image retrieving module 11 at other time points. The image analyzing module 12 can compare FIG. 3A with FIG. 3B and generate the differential image area between FIG. 3A with FIG. 3B.

Figure 4:
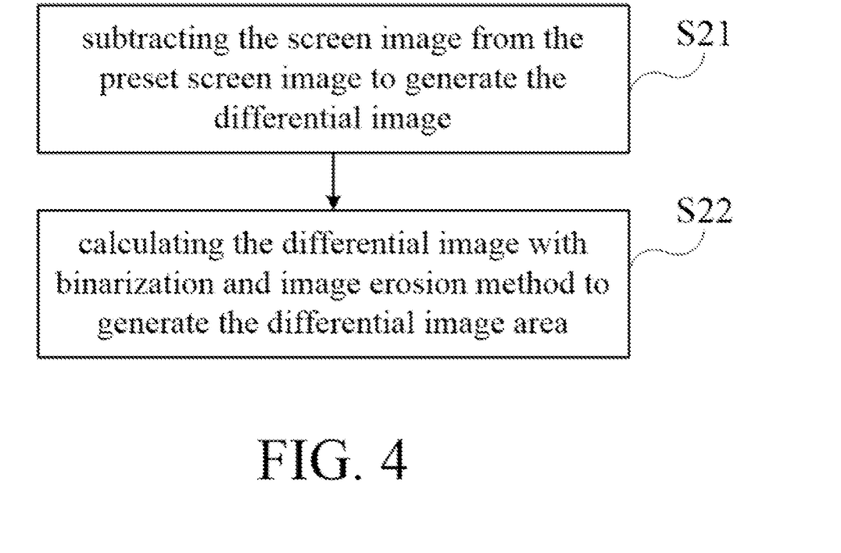
FIG. 4 is a flowchart showing the further steps of the non-intrusive detection method for pop-up window button according to the specific embodiment of FIG. 1.

Please refer to FIG. 1, FIG. 3 and FIG. 4. FIG. 4 is a flowchart showing the further steps of the non-intrusive detection method for pop-up window button according to the specific embodiment of FIG. 1. As shown in FIG. 1 and FIG. 4, in this embodiment, the non-intrusive detection method for pop-up window button further includes the following steps that can be executed by the image analyzing module 12 to generate the differential image area between the screen image and the preset screen image. The steps include that the step S21: the image analyzing module 12 subtracts the screen image from the preset screen image to generate the differential image and the step S22: the image analyzing module 12 calculates the differential image with binarization and image erosion methods to generate the differential image area. In practice, the detailed process of step S21 may be that the image analyzing module 12 converts the screen image and the preset screen image into a gray level image first, and deletes the screen image with the gray level value at the same position by means of image subtraction. When the pop-up window 51 appears on the display device 5, the pop-up window 51 will cover a part of screen image on the display device 5, and the gray level value of the area covered by the pop-up window 51 will be changed. Therefore, when the image analyzing module 12 subtracts the screen image from the preset screen image, the gray level image covered by the pop-up window 51 cannot be deleted, so that the image analyzing module 12 determines the gray level image that cannot be deleted as the differential image.

As mentioned above, the image analyzing module 12 binarizes the differential image in step S22. In practice, when the image analyzing module 12 generates the differential image, each pixel of the differential image includes a gray level differential value. Furthermore, the image analyzing module 12 may include a gray level threshold value, and the image analyzing module 12 may highlight the differential image according to the gray level differential value and the gray level threshold value of the differential image. In practice, the gray level threshold value can be determined according to the screen characteristics of the display device 5 or the gray level value of the differential image. For example, the gray level threshold value is 45. When the gray level differential value of one pixel of the differential image is less than 45, the image analyzing module 12 adjusts the gray level value of the pixel to 0. When the gray level differential value of one pixel of the differential image is greater than or equal to 45, the image analyzing module 12 adjusts the gray level value of the pixel to 225. Therefore, the image analyzing module 12 can optimize and highlight the differential image by image binarization.

In addition, the image analyzing module 12 also processes the differential image through image erosion in the step S22. The image erosion is a method for eliminating small change areas and noise areas in the differential image through structural elements. The structural elements can be a preset area or manually determined. In practice, when the equipment is operating, the production data or numbers will be displayed on the display device 5, and the production data or numbers will change as the equipment operates. Therefore, the number in the screen image retrieved by the image retrieving module 11 may be different from the number in the preset screen image. That is, when the image analyzing module 12 generates the differential image, the gray level differential area generated by the change in production data or numbers will become the small change area and the noise area of the differential image. Therefore, the image analyzing module 12 calculates the differential image by image erosion and generates the differential image area.

Please refer to FIG. 1, FIG. 2 and FIG. 3B. In this embodiment, the image analyzing module 12 further stores an image area threshold value. As shown in step S3 in FIG. 1, the image analyzing module 12 determines whether the differential image area is greater than the image area threshold value after generating the differential image area. In practice, the image area threshold value may be the size or area of the pop-up window. The image area threshold value can be the smallest size value among all pop-up windows that the display device will pop up, or it can be manually set. When the image analyzing module 12 analyzes and determines that the differential image area is greater than the image area threshold value, it means that the differential image area is not an image differential that would occur during normal operation of the equipment. Therefore, the image analyzing module 12 determines the differential image area as the pop-up window 51 on the screen image of the display device 5, as shown in step S4.

On the other hand, if the image analyzing module 12 analyzes and determines that the differential image area is smaller than the image area threshold value, it means that the display device may only change the string instead of popping up the pop-up window. At this time, return to step S13; the operator can control whether the non-intrusive detection device 1 for pop-up window button should end the detection. If the detection is finished, the non-intrusive detection device 1 for pop-up window button will stop the detection of the pop-up window of the display device. If the detection does not finish, please return back to step S1, and the image retrieving module 11 will retrieve the screen image of the display device 5 at the next time point.

Figure 5:
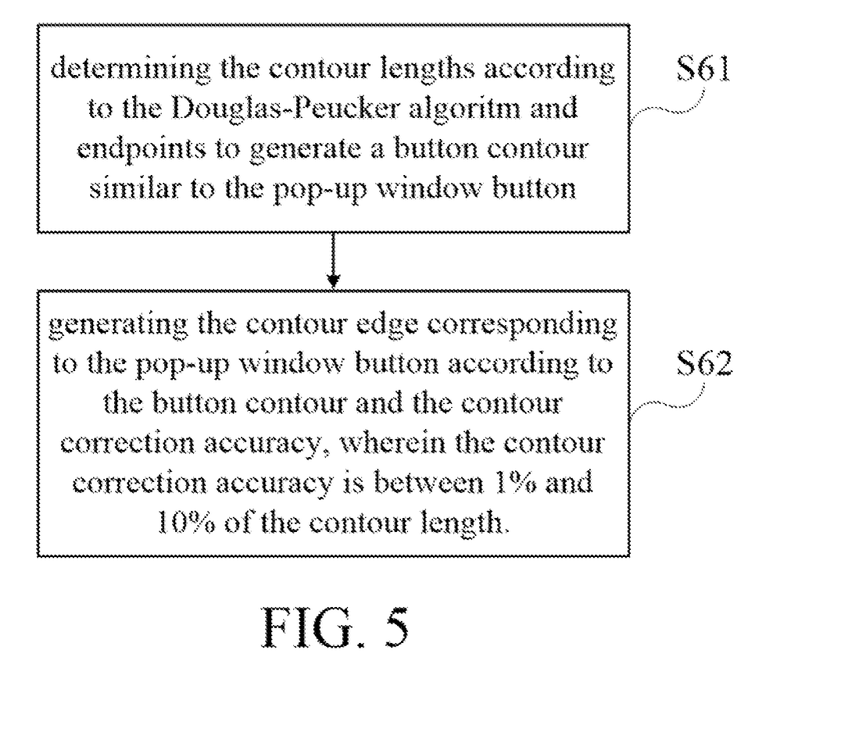
FIG. 5 is a flowchart showing the further steps of the non-intrusive detection method for pop-up window button according to the specific embodiment of FIG. 1.

Please refer to FIG. 1, FIG. 2, FIG. 3, FIG. 5 and FIG. 6. FIG. 5 is a flowchart showing the further steps of the non-intrusive detection method for pop-up window button according to the specific embodiment of FIG. 1. FIG. 6A and FIG. 6B are schematic diagrams showing the recognition of the pop-up window button 52 in the non-intrusive detection method for pop-up window button according to the specific embodiment of FIG. 1. After the image analyzing module 12 recognizes the pop-up window 51, the computing module 13 determines and recognizes the pop-up window button 52 of the pop-up window 51. In the step S5 of FIG. 1, the computing module 13 selects a plurality of contour lengths greater than a contour length threshold value by Canny edge detector. In practice, the pop-up window may include text, button frames, patterns, graphics, and other data. When the computing module 13 calculates the pop-up window 51 by Canny edge detector, the computing module 13 draws and generates the contour of each data (such as characters and lines) in the pop-up window 51, and the contour of each data includes the contour length. The contour length can be a pixel length. The contour length threshold value can be the pixel length of the button frame in the pop-up window, and also can be manually determined, but is not limited thereto. For example, as shown in FIG. 6A, each line segment A in FIG. 6A is the contour length that is equal to or greater than the contour length threshold value. Therefore, if the contour length threshold value is 200 pixels, the computing module 13 will select the contour lengths in the pop-up window 51 that is equal to or greater than 200 pixels after calculating the contour lengths of all the data in the pop-up window 51.

The computing module 13 determines the selected contour lengths by the Douglas-Peucker algorithm and an amount of endpoints to generate the contour edge corresponding to the pop-up window button 52 after generating the contour lengths of all the data in the pop-up window 51.

Figure 6A:
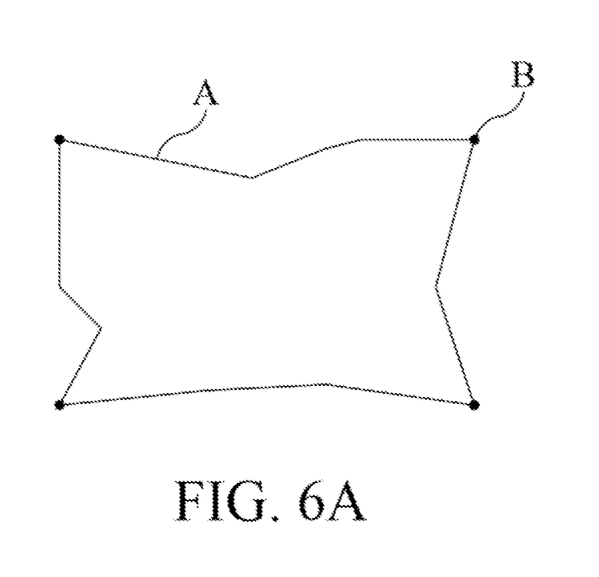
FIG. 6A and FIG. 6B are schematic diagrams showing the recognition of the pop-up window button in the non-intrusive detection method for pop-up window button according to the specific embodiment of FIG. 1
Figure 6B:
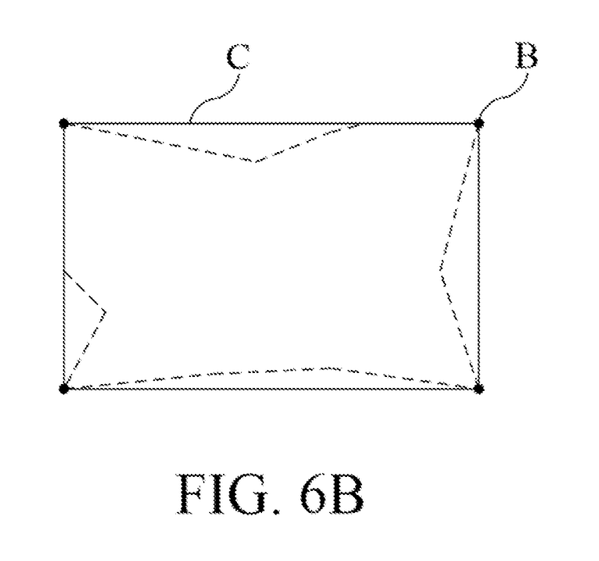

In this embodiment, the non-intrusive detection method for pop-up window button further includes the following steps of: step S61: the computing module 13 determines the contour lengths according to the Douglas-Peucker algorithm and the amount of endpoints to generate a button contour similar to the at least one pop-up window button 52; and step S62: the computing module 13 generates the contour edge corresponding to the pop-up window button 52 according to the button contour and a contour correction accuracy. In practice, the endpoints may be the number of endpoints in the pop-up window 51. When the shape of the pop-up window is rectangular, the endpoints is 4, but it is not limited thereto, the endpoints can be determined according to the shape of the pop-up window. As shown in FIG. 6A, when the computing module 13 determines the contour length by the Douglas-Peucker algorithm and the endpoints with 4, the computing module 13 will find 4 endpoints B among all the contour lengths. At this time, the contour lengths in the rectangle surrounded by the 4 endpoints B form a button contour similar to a pop-up window button. Then, the computing module 13 generates the contour edge corresponding to the pop-up window button 52 according to the button contour and contour correction accuracy. The contour correction accuracy may be the distance dimension (c) of the Douglas-Peucker algorithm, and the contour correction accuracy can be between 1% and 10% of the contour length, but it is not limited thereto, the contour correction accuracy may also be preset or manually determined. As shown in FIG. 6B, when the computing module 13 computes the button contour according to the contour correction accuracy, the computing module 13 will find the line segment with the maximum distance based on the endpoint B and delete the excess contour length (as shown by the dotted line in the figure), and then determine and generate the contour edge C corresponding to the pop-up window button. It should be noted that the pop-up window 51 of FIG. 3B in this embodiment includes two pop-up window buttons 52 and 53, but it is not limited hereto; the number of the pop-up window can also be one or more than three.

As shown in FIG. 1 to FIG. 5, the non-intrusive detection method for pop-up window button of the present invention retrieves the screen image on the display device 5 at different time points by the image retrieving module 11 first. Then, the image analyzing module 12 compares the preset screen image (as shown in FIG. 3A) with the screen image (as shown in FIG. 3B), and generates the differential image area by image subtraction, binarization and image erosion process to determine the pop-up window 51 of the display device 5. Moreover, the computing module 13 computes and recognizes the pop-up window button 52 of the pop-up window 51 by Canny edge detector and Douglas-Peucker algorithm. Finally, the optical character recognizing module 14 recognizes the text of the pop-up window 51. Therefore, the non-intrusive detection method for pop-up window button of the present invention can automatically detect the pop-up window on the screen image of the display device, and recognize all the data of the pop-up window button by the optical character recognizing module.

In summary, the non-invasive detection method and device for the pop-up window button of the present invention can automatically detect the pop-up window of the device and identify the pop-up window button in the pop-up window, thereby improving the practicability. Moreover, the non-intrusive detection method and device for the pop-up window button of the present invention can provide and identify complete pop-up window data, so that the operator can provide solutions based on all the data in the pop-up window, thereby improving processing efficiency and reducing labor costs and production costs. In addition, the non-invasive detection method and device for the pop-up window button of the present invention can also effectively identify the pop-up window of the display device through a variety of image processing methods and image recognition algorithms, thereby improving processing efficiency.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A non-intrusive detection method for pop-up window button configured for recognizing at least one pop-up window button of a pop-up window on a display device, the non-intrusive detection method comprising the following steps of:
    S1: retrieving a screen image of the display device;
    S2: comparing the screen image with a preset screen image, and generating a differential image area according the screen image and the preset screen image;
    S3: determining whether the differential image area is greater than an image area threshold value;
    S4: determining the differential image area as the pop-up window when the differential image area is greater than the image area threshold value;
    S5: presetting a contour length threshold value of the pop-up window, and selecting a plurality of contour lengths greater than the contour length threshold value by Canny edge detector; and
    S6: presetting an amount of endpoints of the at least one pop-up window button, and interpreting the plurality of contour lengths according to Douglas-Peucker algorithm and the amount of endpoints to generate a contour edge corresponding to the at least one pop-up window button.

2. The method of claim 1, further comprising the following steps of:
    S11: determining whether the preset screen image exists, and executing step S2 if the determining result is yes; and
    S12: replacing the preset screen image with the screen image if the determining result of step S11 is no.

3. The method of claim 1, wherein step S2 further comprising the following steps of:
    S21: subtracting the screen image from the preset screen image to generate a differential image; and
    S22: calculating the differential image with binarization and image erosion methods to generate the differential image area.

4. The method of claim 1, wherein step S6 further comprising the following steps of:
    S61: determining the plurality of contour lengths according to the Douglas-Peucker algorithm and the amount of endpoints to generate a button contour similar to the at least one pop-up window button; and
    S62: generating the contour edge corresponding to the at least one pop-up window button according to the button contour and a contour correction accuracy, wherein the contour correction accuracy is between 1% and 10% of the contour length.

5. The method of claim 1, further comprising the following step of:
    S7: analyzing the at least one pop-up window button of the pop-up window by optical character recognition and generating a button text of the at least one pop-up window button.

6. The method of claim 1, wherein the minimum value of the amount of endpoints is 4.

7. A non-intrusive detection device for pop-up window button configured for recognizing at least one pop-up window button of a pop-up window on a display device, the non-intrusive detection device comprising:
    an image retrieving module, configured to retrieve a screen image of the display device;
    an image analyzing module, connected to the image retrieving module and stored a preset screen image and an image area threshold value, wherein the image analyzing module is configured to compare the screen image with the preset screen image and generate a differential image area according the screen image and the preset screen image, the image analyzing module determines the differential image area as the pop-up window when the differential image area is greater than the image area threshold value; and
    a computing module, connected to the image analyzing module and stored a contour length threshold value and an amount of endpoints, wherein the computing module is configured to select a plurality of contour lengths greater than the contour length threshold value by Canny edge detector, and analyze the contour lengths according to Douglas-Peucker algorithm and the amount of endpoints to generate a contour edge corresponding to the at least one pop-up window button.

8. The device of claim 7, wherein the image analyzing module is configured to replace the preset screen image with the screen image when the preset screen image does not exist.

9. The device of claim 7, wherein the image analyzing module subtracts the screen image from the preset screen image to generate a differential image, and calculates the differential image with binarization and image erosion methods to generate the differential image area.

10. The device of the claim 7, wherein the computing module pre-stores a contour correction accuracy, the computing module generates a button contour similar to the at least one pop-up window button according to Douglas-Peucker algorithm and the amount of endpoints, and generates a contour edge corresponding to the at least one pop-up window button according to the button contour and the contour correction accuracy, wherein the contour correction accuracy is between 1% and 10% of the contour length.

11. The device of claim 7, further comprising an optical character recognizing module connected to the computing module, the optical character recognizing module is configured to analyze the at least one pop-up window button of the pop-up window and generates a button text of the at least one pop-up window button.

12. The device of claim 7, wherein the minimum value of the amount of endpoints is 4.

* * * * *